UNITED STATES PATENT OFFICE.

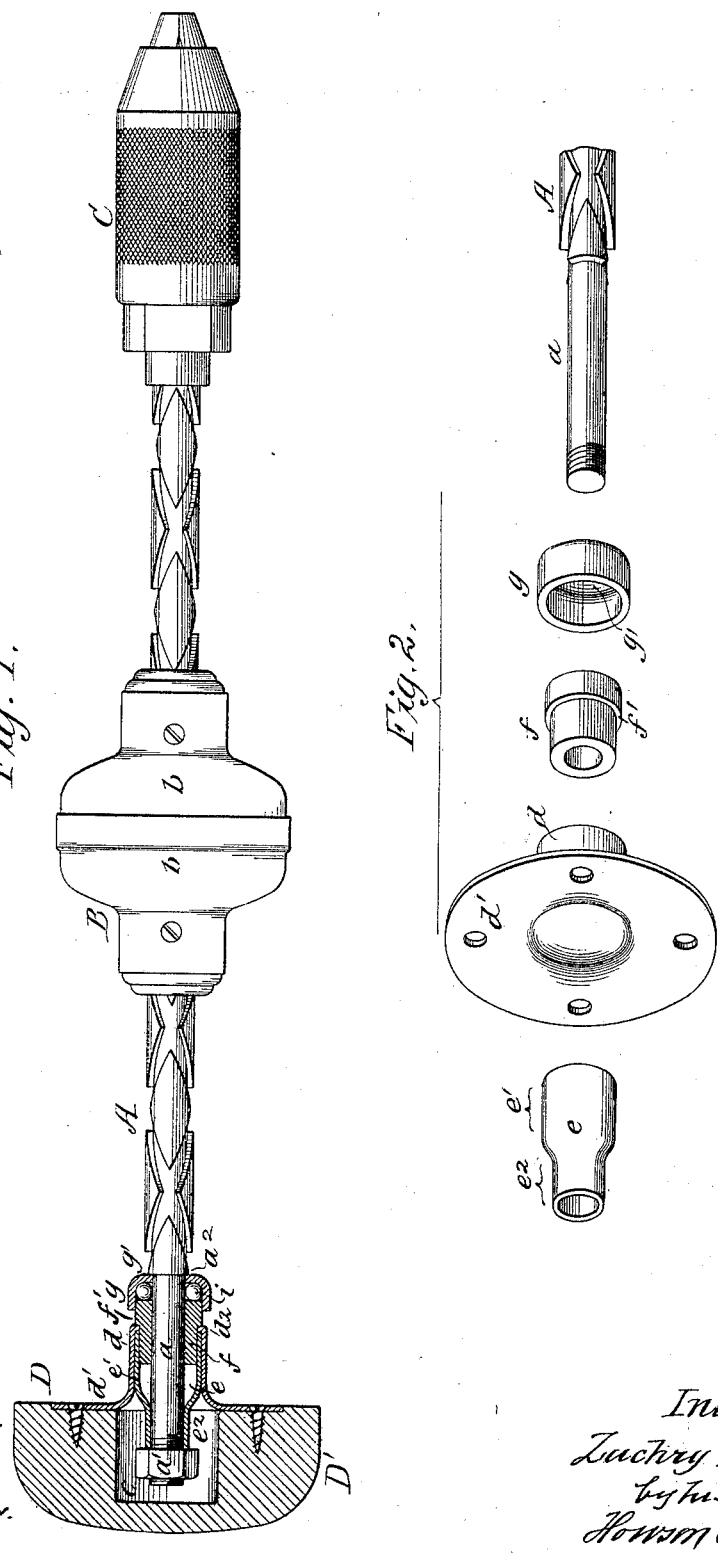

ZACHRY T. FURBISH, OF PHILADELPHIA, PENNSYLVANIA, ASSIGNOR TO NORTH BROTHERS MANUFACTURING COMPANY, OF PHILADELPHIA, PENNSYLVANIA, A CORPORATION OF PENNSYLVANIA.

MEANS FOR SECURING HANDLES OR RESTS TO TOOLS.

SPECIFICATION forming part of Letters Patent No. 701,195, dated May 27, 1902.

Application filed February 27, 1901. Serial No. 49,136. (No model.)

*To all whom it may concern:*

Be it known that I, ZACHRY T. FURBISH, a citizen of the United States, residing in Philadelphia, Pennsylvania, have invented certain Improvements in Means for Securing Handles or Rests to Tools, of which the following is a specification.

The object of my invention is to improve the construction of the mechanism for swiveling the handle or rest to the end of a drilling tool or brace. This object I attain in the following manner, reference being had to the accompanying drawings, in which—

Figure 1 is a side view of a reciprocating ratchet-drill, showing the rest or handle portion in section; and Fig. 2 is a detached perspective view of details of the invention.

The rest or handle of a tool of either the ratchet-drill or brace type must be so arranged that the tool will revolve freely in the handle or rest, and yet will be securely attached thereto.

The views in the accompanying drawings illustrate my invention as applied to a reciprocating ratchet-drill; but it will be understood that it can be applied to any other tool where the head or the handle of the tool must be swiveled to a spindle or crank.

A is the spindle of a tool, having the right and left hand spiral grooves cut as shown, B being the ratchet-slide. Any suitable ratchet mechanism is contained in the casings $b\ b$, said mechanism being so arranged that the spindle will turn continuously in one direction when the slide is reciprocated.

C is the chuck, secured to one end of the spindle. This chuck can be of any form desired, and the particular chuck shown also forms the subject of a separate application filed of even date herewith, Serial No. 49,135.

D is the handle or rest of the tool. The body portion D' of this handle is made of wood or other suitable material and has a cavity $c$, into which extends the reduced portion $a$ of the spindle A. The end of this reduced portion is screw-threaded, and mounted on the screw-threaded portion is a nut $a'$.

$d$ is a flanged hub having a flange $d'$. This flange is secured to the body portion of the handle by ordinary wood-screws in the present instance. Other means of fastening may be employed, however, without departing from my invention. On the end of the hub $d$ is an internal flange $d^2$, and forced into the hub is a sleeve $e$. The portion $e'$ of the sleeve fits the hub, as shown in Fig. 1, while the portion $e^2$ fits the reduced portion $a$ of the drill-spindle, and this sleeve is held between the flange $d^2$ of the hub and the nut $a'$. Forced into the end of the hub is a perforated block $f$, through which the reduced portion $a$ of the spindle passes. This block has a shoulder $f'$ bearing against the flange $d^2$, and beyond this block is a cap $g$, having an internal flange $g'$, which forms a cavity for the reception of a series of antifriction-balls $i$. The cap rests against a shoulder $a^2$, formed by the reduced portion $a$ of the spindle A.

In assembling the parts I first force the sleeve $e$ into the hub $d$, preferably under pressure, and then force the block $f$ into the opposite end of the hub. The cap $g$ is then slipped over the reduced portion $a$ of the spindle A, and the antifriction-balls $i$ are then inserted into the cap, and the hub, with the parts $e$ and $f$ attached, is passed over the reduced portion $a$ of the spindle and the nut $a'$ applied, after which the body portion D' of the handle or rest D can be secured to the flange $d'$ of the hub. A washer may be used between the nut $a'$ and the end of the sleeve $e$, if desired.

By the above arrangement I am enabled to provide a device the parts of which can be readily assembled and which when assembled will form a strong and rigid support for the tool, and yet will allow the spindle or crank to freely rotate in the handle or rest.

I claim as my invention—

1. The combination in a tool in which the spindle rotates in the handle or rest, of a spindle, a handle, a hub secured to the handle and into which the spindle extends, a cap mounted between the hub and a shoulder on the spindle, with a series of antifriction-balls between the cap and the hub, substantially as described.

2. The combination of a spindle, a handle or rest, a flanged hub secured to the handle or rest, a sleeve forced into one end of the hub, a block forced into the opposite end of the hub, the spindle extending through the block and the sleeve, and means for preventing longitudinal movement of the spindle, substantially as described.

3. The combination of a spindle, a handle or rest, a hub, an external flange at one end of the hub, said flange being secured to the handle or rest, an internal flange at the opposite end, a sleeve within the hub resting against the internal flange and reduced to fit the spindle, a block inserted within the opposite end of the hub and resting against the internal flange, the spindle passing through the block in the sleeve, and means for preventing longitudinal movement of the spindle, substantially as described.

4. The combination of a spindle having a reduced portion, a handle or rest, a hub having an internal flange secured to the handle or rest and having an internal flange at the opposite end, a sleeve inserted in the hub and resting against the internal flange and reduced at the opposite end to fit the reduced portion of the spindle, a shouldered block inserted in the hub and resting against the internal flange, a cap resting against a shoulder on the spindle, a series of balls between the cap and the block, and a nut on the end of the spindle confining the spindle longitudinally but allowing it to freely rotate, substantially as described.

In testimony whereof I have signed my name to this specification in the presence of two subscribing witnesses.

ZACHRY T. FURBISH.

Witnesses:
 WILL. A. BARR,
 JOS. H. KLEIN.